(12) United States Patent
Tang et al.

(10) Patent No.: US 7,569,163 B2
(45) Date of Patent: Aug. 4, 2009

(54) POLYTHIOETHER AMINE RESINS AND COMPOSITIONS COMPRISING SAME

(75) Inventors: Guangliang Tang, Glendale, CA (US); Jak H. Aklian, North Hollywood, CA (US); Suresh G. Sawant, Stevenson Ranch, CA (US)

(73) Assignee: PRC DeSoto International, Inc., Glendale, CA (US)

( * ) Notice: Subject to any disclaimer, the term of this patent is extended or adjusted under 35 U.S.C. 154(b) by 326 days.

(21) Appl. No.: 11/687,133

(22) Filed: Mar. 16, 2007

(65) Prior Publication Data

US 2008/0224098 A1     Sep. 18, 2008

(51) Int. Cl.
*H01B 1/02* (2006.01)
*C08G 59/14* (2006.01)
*B05D 1/02* (2006.01)
*C08G 59/50* (2006.01)

(52) U.S. Cl. .................. 252/512; 252/500; 252/513; 252/514; 252/387; 525/524; 525/525; 427/421.1; 427/428.01; 523/400

(58) Field of Classification Search ................. 252/500, 252/512, 513, 514, 387; 525/524, 525; 427/421, 427/428.01; 523/400
See application file for complete search history.

(56) References Cited

U.S. PATENT DOCUMENTS

| | | | |
|---|---|---|---|
| 4,001,156 A | | 1/1977 | Bosso et al. |
| 4,366,307 A | | 12/1982 | Singh et al. |
| 4,436,878 A | * | 3/1984 | Batzill et al. ............... 204/502 |
| 4,728,712 A | | 3/1988 | Singh et al. |
| 4,960,844 A | | 10/1990 | Singh |
| 6,632,860 B1 | * | 10/2003 | Hansen et al. ............... 523/435 |
| 7,037,958 B1 | * | 5/2006 | Hansen et al. ............... 523/428 |
| 7,435,451 B1 | * | 10/2008 | Hansen et al. .......... 427/428.01 |
| 7,435,767 B1 | * | 10/2008 | Hansen et al. ............... 523/428 |
| 7,465,477 B1 | * | 12/2008 | Hansen et al. .......... 427/428.01 |
| 7,470,755 B2 | * | 12/2008 | Abrami et al. ............... 525/523 |

\* cited by examiner

*Primary Examiner*—Mark Kopec
*Assistant Examiner*—Jaison P Thomas
(74) *Attorney, Agent, or Firm*—Diane R. Meyers

(57) ABSTRACT

Polythioether amine resin compounds and compositions comprising the same are disclosed.

33 Claims, No Drawings

POLYTHIOETHER AMINE RESINS AND COMPOSITIONS COMPRISING SAME

FIELD OF THE INVENTION

The present invention is directed to a polythioether amine resin and composition comprising the same.

BACKGROUND INFORMATION

In many industries it is desirable to apply a corrosion-resistant primer to metal. Historically, many of these primers have contained chromate. This is particularly true, for example, in the aerospace industry and the automotive industry. Due to environmental concerns, the minimization and/or elimination of chromate is desired. Use of water-borne, rather than solvent-borne, formulations is also desired. It is further desired to have a primer with good adhesion to subsequent coating layers, chemical resistance, flexibility, and/or solvent resistance.

SUMMARY OF THE INVENTION

The present invention is directed to a polythioether amine resin compound comprising:
  a) 5-90 percent polythioether epoxy resin; and
  b) 10-95 percent epoxy resin;
wherein 10 to 40 equivalent percent of the epoxy groups are quaternized, and wherein 10 to 90 equivalent percent of the non-quaternized epoxy groups are reacted with an amine. The present invention is further directed to a composition comprising this polythioether amine resin compound and a curing agent.

DETAILED DESCRIPTION OF THE INVENTION

The present invention is directed to a polythioether amine resin compound comprising a) 5-90% polythioether epoxy resin and b) 10-95% epoxy resin. Typically, 10 to 40 equivalent percent of the epoxy groups will be quaternized, and of the non-quaternized epoxy groups, 10-90 equivalent percent will be reacted with amine. In certain embodiments, the epoxy resin will have hydroxy functionality, which is further reacted with an isocyanate to form a urethane linkage.

As noted above, 5 to 90 percent of the polythioether amine resin compound comprises a polythioether epoxy resin; by "polythioether" is meant a compound having "C—S—C" bonds. Such a compound has been found to impart flexibility and/or improved adhesion when the polythioether amine resin is used in a coating. In addition, it was surprisingly discovered that use of a polythioether epoxy can impart hydraulic fluid resistance to the compound when used in a coating. A suitable polythioether epoxy is described in U.S. Patent Application No. 2005/0010003, incorporated by reference herein, and is commercially available from PRC DeSoto as PERMAPOL-5534. PERMAPOL 5534 is an epoxy terminated difunctional polythioether polymer having an epoxide equivalent weight (EEW) of 500~690, viscosity of 200~1000 centipoise, specific gravity of 1.13, and solid content of 99 to 100 weight %.

In addition to the performance benefits described above, the polythioether epoxy resin, when such resin has a low viscosity (i.e. less than 1000 cps), can be used as a reactive diluent. This allows solvent use to be minimized if not eliminated from the synthesis process while maintaining a reasonable viscosity for operation. This can allow for formation of a zero VOC formulation. "Zero VOC" means that the formulation has less than 20 percent, such as less than 10 percent, less than 5 percent, or less than 2 percent volatile organic content, or solvent. Film formation temperature can also be significantly lowered by use of the present polythioether epoxy resin.

The polythioether amine resin synthesis further comprises an epoxy resin. Suitable epoxy resins can be, for example, the reaction product of an epoxy functional compound and phenol functional compound. A particular example is the reaction product of an epichlorohydrin and a bisphenol, such as bisphenol A, or any products described, for example, in U.S. Pat. No. 5,204,385, incorporated by reference herein. Suitable epichlorohydrin products include, for example, EPON Resin 825, 826, 828, 829, 830, and 836 from Hexion Specialty Chemicals, and DER330, 331, 332, 354 from Dow Chemical Company. In some embodiments, the epoxy resin can comprise solid epoxy resins with an EEW ranging of 300 to 2000. Suitable products include, for example, EPON Resin 1001F, 1002F and 1004F and 1007F from Hexion Specialty Chemicals and DER661, 662E, 663U, and 664U from Dow Chemical Company. Examples of other epoxy resins suitable for use in the present invention include monoepoxies, diglycidyl ethers of dihydric compounds, epoxy novolacs and cycloaliphatic epoxies, and other modified epoxy resins. Suitable products include, for example, HELOXY modifier 8, 64, 67, 68, 84, 505, CADURA E-10p glycidyl ether, EPON resin SU-3, SU-8 from Hexion Specialty Chemicals, and DER 732, 736, DEN431, 438, 439 from Dow Chemical Company.

It will be appreciated that the polythioether amine resin, specifically the epoxy resin, may have hydroxy functionality, such as if the epoxy resin comprises the reaction product of epichlorohydrin and bisphenol A further reacted with additional bisphenol A. In certain embodiments, the polythioether amine resin comprises hydroxy functional groups and 10 to 40 percent of these hydroxy functional groups, such as 20 to 30 percent, are then further reacted with an isocyanate. This generates a urethane linkage, which increases the functionality of the epoxy resin. The reaction is described, for example, in U.S. Pat. No. 5,369,152, incorporated by reference herein. "Isocyanate" includes isocyanates and dimers and trimers thereof, such as isocyanurates. Suitable isocyanates include, for example, aromatic diisocyanates such as diphenylmethane diisocyanate, and tolylene diisocyanate; alicyclic diisocyanates such as isophorone diisocyanate, and 4,4'-diisocyanate dicyclohexane; aliphatic diisocyanates such as hexamethylene diisocyanate and tetramethylene diisocyanate; and the like. Other suitable isocyanates include, for example, isophorone diisocyanate, methylene diphenyl isocyanate, and hydrogenated methylene diphenyl isocyanate. The isocyanate may have at least two reactive isocyanate groups. Thus, a first isocyanate functional group will react with one hydroxy functionality on one molecule of the polythioether amine resin, and a second isocyanate functional group will react with a hydroxy function group on a second molecule. In this manner, two of such molecules will become crosslinked.

To make the polythioether amine resin water dispersible, approximately 10 to 40 equivalent percent, such as 20 to 30 equivalent percent, of the epoxy groups are quaternized. Quaternization can be carried out using means known in the art, such as those described in U.S. Pat. No. 4,001,156, incorporated by reference herein. The percent quaternization can vary depending on the needs of the user, with a higher quaternization resulting in a smaller particle size having higher water sensitivity. Suitable quaternizing agents typically include salts of tertiary amines and low molecular weight monocarboxylic acids, and are also listed in the '156 patent, incorporated by reference herein. Particularly suitable acids are formic acid, lactic acid and/or acetic acid, and particularly suitable tertiary amines are triethylamine, methyldiethanolamine, triethanolamine, N-ethyl morpholine and/or N-methyl morpholine. The reaction product of lactic acid and/or acetic acid with triethanolamine and/or N-methyl morpholine, reacted in the presence of a small amount of water, is particularly suitable.

The reaction between the epoxide compound and quaternary ammonium salt is generally performed at a temperature of 50° to 100° C., such as 60° to 80° C. The reaction is generally completed in 60 to 90 minutes. It can be conducted in the presence or absence of solvents. Suitable solvents for the reaction include glycol ethers such as ethylene glycol and propylene glycol ethers.

Approximately 10 to 90 percent, such as 70 to 90 percent, of the non-quaternized epoxy groups are chain extended with an amine. In certain embodiments, a slightly stoichiometric excess of amine, such as a polyamine, is used; the epoxy termination is thereby converted to amine termination. Suitable amines include secondary amines and tertiary amines, aliphatic polyamines, alicyclic polyamines, aromatic polyamines, polyamide and aminosilanes. Commercially available products include, for example, ethylenediamine, diethylenetriamine, triethylenetetramine, tetraethylenepentamine, N-aminoethylpiperazine, JEFFAMINE D-230, D-400, and D-2000 from Huntsman International LLC, bis aminomethyl cyclohexane (1,3-BAC) and metaxylene diamine (MXDA) from Mitsubishi Gas Chemical America, Inc., isophorone diamine, such as VESTAMIN IPD and TMD from Degussa, VERSAMID 115, 125, 140 and 150 from Cognis, and SILQUEST 1100, 1120 and 1130 from GE Silicone. In certain embodiments, the amine and epoxy are reacted in an equivalent ratio of 3.0:1.0, such as 2.0:1.0.

The polythioether amine resin compound of the present invention can have a weight average molecule weight (Mw) of 10,000 to 50,000, such as 20,000 to 30,000, as measured in dimethylsulfoxide (DMSO) mobile phase at 100° C. with gel permeation chromatography (GPC).

The present quaternized amine-extended compound can be prepared as described below in the examples. Generally, a water based emulsion can be made using one or more epoxy functional compounds, such as PERMAPOL 5534 and EPON 1001F epoxy resin.

The present invention is further directed to compositions comprising the polythioether amine resin compound described above in conjunction with a suitable curing agent. Particularly suitable is an epoxy silane curing agent. Suitable epoxy silanes are described, for example in U.S. Pat. No. 6,586,502, incorporated by reference herein. Suitable commercially available epoxy silanes include, for example, SILQUEST A-187, A-186 and WETLINK 78 from GE Silicones, KBM-303 and 403 from Shin-Etsu Silicones of America. The compositions can be, for example, coating compositions. A "coating composition" will be understood as one that, when dried and cured, forms a film, such as on a substrate. Here, the curing agent, such as the epoxy amine curing agent, will react with or cure the polythioether amine resin to form a film.

In certain embodiments, an epoxy silane is utilized as the primary if not the only curing agent for the polythioether amine resin. By primary curing agent is meant that at least 50 weight %, such as 70, 80, 90, 95 or 99 weight %, of curing agent comprises an epoxy silane. While the use of epoxy silanes as additives, such as in amounts of 1 to 2 weight % of the formulation for example, to enhance the performance of a coating may be reported, their use as a crosslinker for a polythioether amine is not. Accordingly, in certain embodiments, 10 weight % or greater, such as 10 to 20 weight % of epoxy silane, based on total solid weight of the composition, is used. The polythioether amine resin can be used, for example, in amounts of 20 to 40 weight % based on total solid weight. The combination of the epoxy silane crosslinker with the polythioether amine resin contributes to the hydraulic fluid resistance of the present compositions. Moreover, the crosslinked organic-inorganic combined network is also believed to contribute to improvement in adhesion, chemical resistance, water resistance, and/or corrosion resistance. In addition, hydroxyl groups generated through the reaction of the epoxy silane and the polythioether amine may contribute to intercoat adhesion, by reacting with previous or subsequent coating layers.

The curing agent can be maintained separately from the polythioether amine resin compound until just prior to application, i.e. a two component or "2K" composition. In the coating composition, the polythioether amine resin compound can comprise 50 to 90 weight %, such as 60 to 80 weight %, and the curing agent can comprise 10 to 50 weight %, such as 20 to 40 weight %, with weight % being based on the total solid weight of the resin binder composition.

In certain embodiments, the coating compositions are water-based. As used herein, the term "water-based" refers to compositions where the solvent comprises water in an amount of 50 percent or greater. Thus, a water-based solution according to the present invention can still comprise less than 50 percent organic solvents, such as alcohol, acetate, ester, ketone, aromatic and aliphatic hydrocarbons, and glycol ethers. In certain embodiments, the compositions comprise 20 percent or less, such as 10 percent or less or 5 percent or less, of a solvent other than water. It is an advantage of the present invention that a water based composition can be formed, thereby limiting the amount of volatiles in the composition.

The coating compositions of the present invention can contain any additives standardly used in the coatings field, such as reactive diluents, flow-additives, antisettling agents, pigments, fillers, rheology modifiers, solvents, UV light absorbers, catalysts, and the like. Such additives can comprise 40 to 70 weight % of the coating, based upon total solid weight of the coating composition.

Fillers used to impart electrical conductivity and/or electromagnetic interference/radio frequency interference (EMI/RFI) shielding effectiveness are well known in the art. Examples of suitable fillers include but are not limited to electrically conductive noble metal-based fillers such as pure silver; noble metal-plated noble metals such as silver-plated gold; noble metal-plated non-noble metals such as silver plated copper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal based materials can also be suitable including, for example, non-noble metal-plated non-noble metals such as copper-coated iron particles or nickel plated copper; non-noble metals, e.g. copper, aluminum, nickel, cobalt; non-noble-metal-plated-non metals, e.g., nickel-plated graphite and non-metal materials such as carbon black and graphite.

Pigments are also well known in the art. In certain embodiments, the pigments are anti-corrosive pigments such as chromate or non-chromate corrosion inhibitors. It is yet another feature of the invention that the present polyetheramine resins are compatible with such additives. "Chromate" and like terms refer to any compound comprising chromium or derivatives thereof. For example, the present compositions can be water-based chromate systems, such as those used in various industries as a primer. Examples of suitable chromate corrosion inhibitors include strontium chromate, barium chromate, zinc chromate, and calcium chromate.

In other embodiments, the present compositions are substantially chromate-free, and can also be used in anti-corrosion formulations, such as water-based chromate-free systems, such as those used in various industries as a primer. "Substantially chromate-free" and like terms means that there is substantially no chromate in the composition; that is, less than 1 weight % of the composition comprises chromate. Examples of non-chromate corrosion inhibitors include, for example, zinc phosphate, and zinc molybdate from Aldrich, HALOX SZP391, SW111, 300, 570, 630 and 650 from Halox.

"Anti-corrosive pigments", as used herein, refers to particles that, when included in a coating composition that is deposited upon a substrate, act to provide a coating that minimizes or, in some cases, even prevents, the alteration or degradation of the substrate, such as by a chemical or electrochemical oxidizing process, including rust in iron containing substrates and degradative oxides in aluminum substrates.

In certain embodiments, the corrosion resisting particles comprise an inorganic oxide, in some embodiments a plurality of inorganic oxides. Suitable inorganic oxides include, for example, zinc oxide (ZnO), magnesium oxide (MgO), cerium oxide ($CeO_2$), molybdenum oxide ($MoO_3$), and/or silicon dioxide ($SiO_2$), among others. As used herein, the term "plurality" means two or more. Therefore, certain embodiments of coating compositions of the present invention comprise corrosion resisting particles comprising two, three, four, or more than four inorganic oxides. In certain embodiments, these inorganic oxides are present in such particles, for example, in the form of a homogeneous mixture or a solid-state solution of the plurality of oxides.

In certain embodiments, the corrosion resisting particles comprising an inorganic oxide, or, in certain embodiments, a plurality thereof, comprise an oxide of zinc, cerium, yttrium, manganese, magnesium, molybdenum, lithium, aluminum, magnesium, tin, and/or calcium. In certain embodiments, the particles also comprise an oxide of boron, phosphorous, silicon, zirconium, iron, and/or titanium. In certain embodiments, the particles comprise silicon dioxide.

In certain embodiments, the corrosion resisting particles comprise a plurality of inorganic oxides selected from (i) particles comprising an oxide of cerium, zinc, and silicon; (ii) particles comprising an oxide of calcium, zinc and silicon; (iii) particles comprising an oxide of phosphorous, zinc and silicon; (iv) particles comprising an oxide of yttrium, zinc, and silicon; (v) particles comprising an oxide of molybdenum, zinc, and silicon; (vi) particles comprising an oxide of boron, zinc, and silicon; (vii) particles comprising an oxide of cerium, aluminum, and silicon, (viii) particles comprising oxides of magnesium or tin and silicon, and (ix) particles comprising an oxide of cerium, boron, and silicon, or a mixture of two or more of particles (i) to (ix).

In certain embodiments, the previously described anti-corrosive pigments have a calculated equivalent spherical diameter of no more than 200 nanometers, such as no more than 100 nanometers, or, in certain embodiments, 5 to 50 nanometers. As will be understood by those skilled in the art, a calculated equivalent spherical diameter can be determined from the B.E.T. specific surface area according to the following equation:

$$\text{Diameter (nanometers)}=6000/[BET(m^2/g)*\rho(grams/cm^3)]$$

Certain embodiments of the coating compositions of the present invention comprise anti-corrosive pigments having an average primary particle size of 100 nanometers or less, such as 50 nanometers or less, or, in certain embodiments, 20 nanometers or less, as determined by visually examining a micrograph of a transmission electron microscopy ("TEM") image, measuring the diameter of the particles in the image, and calculating the average primary particle size of the measured particles based on magnification of the TEM image. One of ordinary skill in the art will understand how to prepare such a TEM image and determine the primary particle size. The primary particle size of a particle refers to the smallest diameter sphere that will completely enclose the particle. As used herein, the term "primary particle size" refers to the size of an individual particle as opposed to an agglomeration of two or more individual particles.

In certain embodiments, the anti-corrosive pigments comprise magnesium oxide particles having an average primary particle size of 100 nanometers or less; such particles are commercially available from Nanostructured & Amorphous Materials, Inc., Houston, Tex.

Suitable anti-corrosive pigments of the type previously described, as well as suitable methods for their production, are described in U.S. patent application Ser. No. 11/384,970 at [0020] to [0070], the cited portion of which is incorporated herein by reference.

In certain embodiments, the anti-corrosive pigments comprise an inorganic oxide network comprising one or more inorganic materials. As used herein, the term "inorganic oxide network comprising one or more inorganic materials" refers to a molecular chain comprising one, or, in some cases, two or more different inorganic materials chemically connected to each other through one or more oxygen atoms. Such a network may be formed from hydrolysis of metal salts, examples of which include, but are not limited to, $Ce^{3+}$, $Ce^{4+}$, $Zn^{2+}$, $Mg^{2+}$, $Y^{3+}$, $Ca^{2+}$, $Mn^{7+}$, and $Mo^{6+}$. In certain embodiments, the inorganic oxide network comprises zinc, cerium, yttrium, manganese, magnesium, or calcium. In certain embodiments, the inorganic oxide network also comprises silicon, phosphorous, and/or boron. In certain embodiments, the inorganic oxide network comprises cerium, zinc, zirconium, and/or manganese, as well as silicon. In certain embodiments, the inorganic oxide network comprises 0.5 to 30 percent by weight cerium and 0.5 to 20 percent by weight zinc, with the weight percents being based on the total weight of the material.

In certain embodiments, the inorganic oxide network comprises silicon resulting from the hydrolysis of an organosilane, such as silanes comprising two, three, four, or more alkoxy groups. In certain embodiments, the inorganic oxide network comprises silicon resulting from a silicate, such as potassium silicate, sodium silicate, and/or ammonium silicate.

In certain embodiments, the anti-corrosive pigments comprising an inorganic oxide network, as described above, are ultrafine particles.

Anti-corrosive pigments comprising an inorganic oxide network, which are suitable for use in the present invention, can be prepared as described in U.S. patent application Ser. No. 11/384,970 at [0071] to [0073] and/or U.S. patent application Ser. No. 11/610034 at [0039] to [0044], the cited portions of each of which are incorporated herein by reference.

In certain embodiments, the anti-corrosive pigments comprise a clay. In certain embodiments, such clays are treated with a lanthanide and/or transition metal salt. Suitable clays include, for example, layer structured LAPONITE (a hydrous sodium lithium magnesium silicate modified with tetra sodium pyrophosphate commercially available from Southern Clay Products, Inc.) and bentonite (an aluminum phyllosilicate generally impure clay consisting mostly of montmorillonite, $(Na,Ca)_{0.33}(Al,Mg)_2Si_4O_{10}(OH)_2 \cdot nH_2O$). Such corrosion resisting particles may be prepared as described in U.S. patent application Ser. No. 11/384,970 at [0076], the cited portion of which being incorporated herein by reference.

In certain embodiments, the anti-corrosive pigments comprising an inorganic oxide in combination with a pH buffering agent, such as, for example, a borate. As used herein, the term "pH buffering agent" refers to a material that adjusts the pH of the inorganic oxide to a level higher than the pH would be in the absence of the material. In certain embodiments, such corrosion resisting particles comprise a mixed metal oxide that includes borate ($B_2O_3$), and one or more oxides of zinc, barium, cerium, yttrium, magnesium, molybdenum, lithium, aluminum, or calcium. In certain embodiments, such a mixed oxide is deposited on and/or within a support.

As used herein, the term "support" refers to a material upon which or in which another material is carried. In certain embodiments, the corrosion resisting particles comprise an inorganic oxide, a borate, and a silica support, such as fumed silica, commercially available under the tradename AEROSIL from Degussa, or precipitated silica, such as HI-SIL T600 from PPG Industries, Pittsburgh, Pa. In certain embodiments, the support has an average primary particle size of no more than 20 nanometers.

Specific non-limiting examples of suitable anti-corrosive pigments comprising a mixed metal oxide including borate comprise $CaO \cdot B_2O_3$, $BaO \cdot B_2O_3$, $ZnO \cdot B_2O_3$, and/or $MgO \cdot B_2O_3$. Such anti-corrosive pigments, as well as methods for their production, are described in U.S. patent application Ser. No. 11/384,970 at [0079] and U.S. patent application Ser. No. 11/567947 at [0047] to [0053], the cited portions of each of which are incorporated herein by reference.

In certain embodiments, the anti-corrosive pigments comprise chemically modified particles having an average primary particle size of 500 nanometers or less, in some cases, 200 nanometers or less, and, in yet other cases, 100 nanometers or less, as described in U.S. patent application Ser. No. 11/384,970 at [0082] to [0083], the cited portion of which is incorporated herein by reference.

The present invention is further directed to a method for using any of the coatings described above. The coating can be applied to at least a portion of a substrate. Any suitable substrate can be coated according to the present invention, including aluminum alloys such as 2024 and 7075, which are generally used in the aerospace industry, and titanium. The surface can be abraded, such as with a SCOTCH-BRITE Pad, treated with a chemical conversion coating, anodized, such as with ALODINE 600, 1000, 1200, conforming to procedure BAC5719, chromic acid anodized (CAA), phosphoric acid anodized (PAA) or boric acid anodized (BAA), conforming to procedure BAC5019. The present compositions can also be used on composite, wood, steel, other metals and/or concrete substrates. The present compositions show good adhesion to a number of substrates. In certain embodiments, the substrate forms part of an aerospace or aviation vehicle.

The coating compositions of the present invention can be applied as a primer directly to the surface of a substrate, wherein the substrate may or may not have been subjected to pretreatment methods and/or solutions standard in numerous industries, such as in the aerospace industry for imparting corrosion protection, such as treating with ALODINE or anodizing, as described above. In this embodiment, the primer layer can be cured and additional layers applied thereto, such as topcoats, clearcoats and the like.

The present coating compositions can be applied by any means known in the art, such as spraying, dipping, roll coating, brush application, casting, and the like. The coating can have a dry film thickness of 0.1 to 5 mils, such as 0.4 to 1.5 mils or 0.6 to 1.0 mils. Upon cure, the coatings can exhibit good fluid or solvent resistance. Such resistance can be tested by hot hydraulic fluid resistance, which is a standard test used in the aerospace industry. A cured coating sample is immersed in hot hydraulic fluid for a specified amount of time and the appearance is checked for any coatings defects, such as blistering, cracking or adhesion failure. The cured coatings also have good adhesion, both to substrates and subsequent coating layers. Generally, after 2 to 4 hours of applying the primer, a topcoat is applied. Cross-section adhesion can be tested according to BSS 7225 or ISO 4209.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa. For example, while reference is made herein, including the claims, to "a" polythioether amine resin, "a" polythioether epoxy resin, "an" epoxy resin, "an" isocyanate, "a" quaternizing agent, "an" amine, "an" epoxy silane, "an" anti-corrosive pigment and the like, one or more of all of these things can be used. Also, as used herein, including the claims, the term "polymer" is meant to refer to prepolymers, oligomers and both homopolymers and copolymers; the prefix "poly" refers to two or more.

EXAMPLES

The following examples are intended to illustrate the invention, and should not be construed as limiting the invention in any way.

Example 1

WB Amine Resin Synthesis Without Polythioether (Control)

509.0 grams EPON 1001F, 56.4 grams DEN431 and 141.1 grams of EASTMAN EP solvent (from Eastman Chemical Company) were charged into a 2-liter reactor equipped with mechanical agitator, nitrogen blanket, thermal coupler, cooling condenser and heating mantle. The reaction temperature was raised to 100° C. in about 30 minutes with mild agitation under nitrogen atmosphere. The mixture was held 20 minutes at that temperature to completely melt the solid resin. The reaction temperature was set to 64° C. At this temperature, 104.5 grams of quaternary ammonium salt prepared by mixing 25.6 grams N-methyl morpholine (NMM), 15.3 grams acetic acid and 63.6 grams deionized water in a separate container was metered to the reaction vessel over 10 to 15 minutes. The reaction was maintained at 63° C. for 60 to 90 minutes to salt the epoxy resin. The epoxy equivalent weight (EEW) of the quaternized epoxy resin solution was 780. The EEW was titrated according to ASTM D1652. At that temperature, 727.2 grams deionized water was metered over 10 to 15 minutes to obtain a stable epoxy resin dispersion. The temperature dropped to around 50° C. with the addition of the dispersing water. 27.6 grams MXDA and 34.4 grams VESTAMIN IPD were metered over 10 to 15 minutes and the reaction temperature maintained at around 50° C. The reaction was held for 60 to 90 minutes to complete the reaction. The reaction was cooled to ambient temperature and a stable dispersion obtained with the following physical properties: Brookfield Viscosity (Spindle #1, 10 rpm): 90 centipoise, Solid content (110° C./one hour): 42~43%, Particle size: 0.5812 microns.

Example 2

WB Amine Resin Synthesis with Polythioether 502.5.0 grams EPON 1001F, 55.7 grams PERMAPOL 5534 and 125.6 grams of EASTMAN EP solvent were charged into a 2-liter reactor equipped with mechanical agitator, nitrogen blanket, thermal coupler, cooling condenser and heating mantle. The reaction temperature was raised to 100° C. in about 30 minutes with mild agitation under nitrogen atmosphere. The mixture was held 20 minutes at that temperature to completely melt the solid resin. The reaction temperature was set to 64° C. At that temperature, 77.2 grams quaternary ammonium salt prepared by mixing 18.8 grams NMM, 11.3 grams acetic acid and 47.1 grams deionized water in a separate container was metered to the reaction vessel over 10 to 15 minutes. The reaction was maintained at 63° C. for 60 to 90 minutes to salt the epoxy resin. The EEW of the quaternized epoxy resin solution was 765. At that temperature, 787.3 grams of deionized water was metered over 10 to 15 minutes and obtained stable epoxy resin dispersion. The temperature dropped to around 50° C. with the addition of the dispersing water. 22.9 grams MXDA and 28.6 grams VESTMIN IPD were metered over 10 to 15 minutes and the reaction temperature maintained at around 50° C. The reaction was held for 60 to 90 minutes to complete the reaction. The reaction was cooled to ambient temperature and a stable dispersion obtained with the following physical properties: Brookfield Viscosity (Spindle #1, 10 rpm): 64 centipoise, Solid content (110° C./one hour): 42~43%, Particle size: 0.2249 microns.

Example 3

Zero VOC WB Amine Resin Synthesis with Polythioether 345.3 grams EPON 828 and 98.7 grams PERMAPOL 5534 were charged into a 2 liter reactor equipped with mechanical agitator, nitrogen blanket, thermal coupler, cooling condenser and heating mantle. The reaction temperature was raised to 90° C. in about 20 minutes with mild agitation under nitrogen atmosphere. At that temperature, 111.0 grams bisphenol A and 0.2 grams ethyltriphenyl phosphonium acetate (70% in methanol) was charged to the heated mixture. The reaction temperature was increased to 170° to 180° C. in 60 minutes and held for 60 to 120 minutes. Thereafter, heating was discontinued and the reaction temperature was set to 64° C. At that temperature, 94.8 grams quaternary ammonium salt prepared by mixing 23.1 grams of NMM, 13.9 grams acetic acid and 58.8 grams of deionized water in a separate container was metered to the reaction vessel over 10 to 15 minutes. The reaction was maintained at 63° C. for 60 to 90 minutes to salt the epoxy resin. The EEW of the quaternized epoxy resin solution was 720. At that temperature, 900.2 grams of deionized water was metered over 10 to 15 minutes and obtained stable epoxy resin dispersion. The temperature dropped to around 50° C. with the addition of the dispersing water. 49.8 grams MXDA were metered over 10 to 15 minutes and the reaction temperature maintained at around 50° C. The reaction was held for 60 to 90 minutes to complete the reaction. The reaction was cooled to ambient temperature and a stable dispersion obtained with following physical properties: Brookfield Viscosity (Spindle #1, 10 rpm), 70 centipoise, Solid content (110° C./one hour): 42~43%, Particle size: 0.2014 microns.

Example 4

Hydraulic Fluid Resistance

The waterborne amine resins prepared according to Examples 1 to 3 were mixed with SILQUEST A-187 (epoxy silane, commercially available from GE Silicones) and applied on chromic acid anodized (CAA) (conforming BAC5019) panels. The films were cured for one week at ambient temperature. Dry film thickness was 0.6 to 1.0 mils. Thereafter, panels were soaked in 70° C. hydraulic fluid (SKYDROL LD-4 from Solutia Inc.) for 24 hours and 30 days respectively and checked for film appearance.

TABLE 1

Waterborne Amine Resins Cured with Epoxy Silane

| | Coating 1 | Coating 2 | Coating 3 |
|---|---|---|---|
| Ingredient | | | |
| WB amine resin, example 1 | 10.0 | 0.0 | 0.0 |
| WB amine resin, example 2 | 0.0 | 10.0 | 0.0 |
| WB amine resin, example 3 | 0.0 | 0.0 | 10.0 |
| SILQUEST A-187 | 2.0 | 2.0 | 2.0 |
| Total Weight (grams) | 12.0 | 12.0 | 12.0 |
| Hydraulic Fluid Resistance Results | | | |
| 24 hours at 70° C. | Big Blistering Failed | Pass* | Pass |
| 30 days at 70° C. | NA | Pass | Pass |

*Notes:
Pass means no blistering, no cracking and no adhesion failure.

As shown in this example, coatings prepared from the polythioether amine resin of the present invention demonstrated excellent hydraulic fluid resistance when cured with epoxy silane, while the control resin did not pass the test under the same conditions.

Example 5

Waterborne Primer Formulation

As shown in Example 4, the control (Example 1) waterborne amine didn't pass hydraulic fluid resistance; therefore it was not further formulated with pigments. One resin of the present invention (Example 2) was further formulated with pigments and performance tested according to the specifications discussed below. The formulation is given in the following table.

TABLE 2

Primer Formulation with Waterborne Resin of Example 2

| | Ingredient | Weight (grams) |
|---|---|---|
| | Base Component | |
| 1 | Waterborne Amine resin from Example 2 | 40.3 |
| 2 | EASTMAN EP Solvent from Eastman | 7.3 |
| 3 | DOWANOL PNB from Dow Chemicals | 0.7 |
| 4 | Benzyl alcohol | 0.4 |
| 5 | DI Water | 14.6 |
| 6 | 1-Butanol | 2.6 |
| 7 | Methyl amyl ketone | 0.7 |
| 8 | TI PURE R-900 from Dupont | 25.6 |
| 9 | Calcium dihydrogen phosphonate | 0.2 |
| 10 | HALOX 650 from Halox | 0.2 |
| 11 | HALOX SZP-391 from Halox | 3.7 |
| 12 | KADOX 720C from Zinc Corporation of America | 3.7 |
| 13 | RAVEN 14 from Columbian Chemicals Company | 0.0 |
| | Sub Total 1 | 100.0 |
| | Activator Component | |
| 15 | SILQUEST A-187 from GE Silicone | 6.9 |
| 16 | Ethanol | 0.9 |
| 17 | TI PURE R-900 from Dupont | 7.1 |
| | Sub Total 2 | 14.9 |

As shown in Table 2, base component was prepared by adding ingredients 2~7 to ingredient 1 under mild agitation, then ingredients 8~13 were added under high shear mixing to Hegman fineness grind above 5 (ISO 1524). Activator component was prepared by adding ingredient 17 to a premixture of 15 and 16 under high shear mixing to Hegman fineness grind above 5.

Primer was prepared by mixing 100 grams of base compent with 14.9 grams of activator compent and sprayed on chromic acid anodized (CAA) (conforming BAC5019) panels, which were allowed to cure for one week at ambient temperature before testing. Dry film thickness was 0.6 to 1.0 mils. The following properties were tested according to the listed ISO methods.

TABLE 3

Typical Property Test for Waterborne Primer

| Property | Test Method | Particular Conditions | Requirements |
|---|---|---|---|
| Surface appearance | ISO4628 | | No blister, no opaque deposit, no surface flows |
| Hydraulic Fluid Resistance | ISO2812, ISO4628, ISO1518 | 70° C./1000 h | No cracking, blistering or other damage. No penetration to the substrate up to a load of 1200 g. |
| Adhesion | ISO2409 | | Degree 0 |
| Scratch resistance | ISO1515 | | No penetration to the substrate for a load of 1200 g |
| Impact Resistance | ISO6272 | Impact at the non-coated side, penetration is 3.8 mm | Degree ≦ 2 |
| Flexibility | ISO1519 | Progressive bending through 180° around D2mm mandrel at 23 ± 2° C. and 50% RH | No peeling, no damage, no crack |
| Water resistance | ISO2812, ISO4628, ISO2409, ISO1518 | Partial immersion, 23° C./14 d, check within 30 min | No peeling, no damage, no crack. No penetration to the substrate up to a load of 1200 g. Degree 1 |
| Humidity resistance | ISO6270, ISO4628 | 500 h at 45 ± 5° C., 90 ± 10% RH | No cracking, blistering or other damage. No penetration to the substrate up to a load of 1200 g |
| Salt Spray | ISO7253, ISO4628 | 3000 h, cut a perpendicular cross | No blister, no corrosion extending further than 1.25 mm on either side of scratch |

TABLE 4

Results of the Tested Waterborne Primer

| Property | Results |
|---|---|
| Surface appearance | PASS |
| Hydraulic Fluid Resistance (SKYDROL) | Pass, Scratch resistance: 1500 g load |
| Adhesion | Pass, Degree 0, no adhesion failure |
| Scratch resistance | Pass, Scratch resistance: 1500 g load |
| Impact Resistance | Pass, no cracks |
| Flexibility | Pass, no peeling, no damage, no cracks. |
| Water resistance | Pass, adhesion: degree 0, Scratch resistance: 1500 g load |
| Humidity resistance | Pass, degree 0, no blisters, no adhesion failure |
| Salt Spray | No blisters, No corrosion |

As shown above, the waterborne primer of the present invention, formulated with the polythioether waterborne amine resin compound of Example 2 and cured with epoxy silane SILQUEST A-187, demonstrated excellent hot hydraulic fluid resistance, adhesion, flexibility, humidity and water resistance. The waterborne primer further demonstrated excellent salt-fog resistance. After 3000 hours of contiuous salt-fog test, no blistering was noticed on the primer panels. In addition, a high solid solventborne urethane topcoat CA8000 from PRC-DeSoto International Inc. was sprayed on the top of the waterborne primer. It didn't show any adhesion failure and exhibited excellent intercoat adhesion.

Whereas particular embodiments of this invention have been described above for purposes of illustration, it will be evident to those skilled in the art that numerous variations of the details of the present invention may be made without departing from the invention as defined in the appended claims.

What is claimed is:

1. A polythioether amine resin compound comprising:
a) 5-90 percent polythioether epoxy resin; and
b) 10-95 percent epoxy resin;

wherein 10 to 40 equivalent percent of the epoxy groups are quaternized, and wherein 10 to 90 equivalent percent of the non-quaternized epoxy groups are reacted with an amine.

2. The compound of claim 1, wherein at least some of the epoxy functional groups are derived from epichlorohydrin.

3. The compound of claim 2, wherein at least some of the epoxy functional groups are derived from the reaction of the epichlorohydrin with bisphenol.

4. The compound of claim 3, wherein the bisphenol comprises bisphenol A.

5. The compound of claim 1, wherein the polythioether epoxy resin has an epoxide equivalent weight of 500-690.

6. The compound of claim 1, wherein the quaternizing agent comprises the reaction product of acetic acid and/or lactic acid with triethylamine and/or N-methyl morpholine.

7. The compound of claim 1, wherein the amine comprises metaxylene diamine, isophorone diamine, and/or bis aminomethyl cyclohexane.

8. The compound of claim 1, wherein the amine groups and epoxy groups are reacted in an equivalent ratio of 3.0:1.0.

9. The compound of claim 1, wherein 20 to 30 equivalent percent of the epoxy groups are quaternized.

10. The compound of claim 1, wherein the weight average molecular weight of the compound is 10,000 to 50,000.

11. The compound of claim 1, wherein the weight average molecular weight of the compound is 20,000 to 30,000.

12. A composition comprising:
a) the polythioether amine resin compound of claim 1; and
b) a curing agent.

13. The composition of claim 12, wherein the composition is a coating composition.

14. A method for using the coating composition of claim 13, comprising applying said composition to at least a portion of a substrate.

15. The method of claim 14, wherein the coating composition is applied to the substrate as a primer.

16. The method of claim 14, wherein the coating composition is water-based.

17. The method of claim 14, wherein the coating composition is substantially chromate free.

18. The method of claim 14, wherein the substrate comprises part of an aerospace or aviation vehicle.

19. The composition of claim 12, wherein the curing agent comprises epoxy silane.

20. The composition of claim 12, wherein the composition further comprises one or more additives.

21. The composition of claim 20, wherein the composition comprises 20 to 40 weight percent polythioether amine resin, 10 to 20 weight percent curing agent, and 70 to 40 weight percent additives, wherein weight percent is based on total solid weight.

22. The composition of claim 12, wherein the composition has two components, with the polythioether amine resin in one component and the curing agent in the other component.

23. The composition of claim 12, wherein the composition is substantially chromate free.

24. The composition of claim 20, wherein the additives comprise one or more pigments.

25. The composition of claim 24, wherein the pigment comprises one or more non-chromate corrosion inhibitors.

26. The composition of claim 25, wherein the non-chromate corrosion inhibitor comprises an anti-corrosive pigment having an average primary particle size of 100 nanometers or less.

27. The composition of claim 26, wherein the anti-corrosive pigment comprises magnesium oxide.

28. The composition of claim 20, wherein the additives comprise one or more fillers that impart electrically conductivity and/or EMI/RFI shielding to the compound.

29. The composition of claim 12, wherein said composition is water-based.

30. The polyether amine resin of claim 1, wherein said resin further comprises hydroxy groups, and at least some of the hydroxy groups are reacted with an isocyanate.

31. The polyether amine resin of claim 30, wherein 10 to 40% of the hydroxy groups are reacted with isocyanate.

32. The polyether amine resin of claim 30, wherein the isocyanate comprises isophorone diisocyanate, hexamethylene diisocyanate, methylene diphenyl isocyanate and/or hydrogenated methylene diphenyl isocyanate.

33. A composition comprising:
a) the polythioether amine resin of claim 30, and
b) a curing agent.

* * * * *